United States Patent [19]

Kawamura

[11] Patent Number: 5,264,747
[45] Date of Patent: Nov. 23, 1993

[54] PERMANENT MAGNET TYPE STEPPING MOTOR AND ADJUSTING METHOD FOR MINIMIZING ITS DETENT TORQUE

[75] Inventor: Hiroshi Kawamura, Tokyo, Japan
[73] Assignee: Sony Corporation, Japan
[21] Appl. No.: 780,342
[22] Filed: Oct. 22, 1991

[30] Foreign Application Priority Data

Oct. 31, 1990 [JP] Japan .................................. 2-294095

[51] Int. Cl.$^5$ .................................................. H02K 37/10
[52] U.S. Cl. .................................................. 310/49 R; 310/42
[58] Field of Search .................................... 310/42, 49 R

[56] References Cited

U.S. PATENT DOCUMENTS

| | | | |
|---|---|---|---|
| 4,319,398 | 3/1982 | Fukuzawa et al. | 310/42 X |
| 4,839,546 | 6/1989 | Kitahara | 310/51 |
| 4,877,987 | 10/1989 | Flaig et al. | 310/209 |
| 4,896,035 | 1/1990 | Tsuyama | 310/154 |
| 4,955,128 | 9/1990 | Sogabe et al. | 310/42 X |

FOREIGN PATENT DOCUMENTS

| | | | |
|---|---|---|---|
| 0196754 | 8/1988 | Japan | 310/49 R |
| 0190248 | 7/1989 | Japan | 310/49 R |
| 0223370 | 9/1990 | Japan | 310/49 R |

Primary Examiner—Steven L. Stephan
Assistant Examiner—Judson H. Jones
Attorney, Agent, or Firm—Ronald P. Kananen

[57] ABSTRACT

A stepping motor minimizes detent torque without causing a considerable dispersion among individual stepping motors. The stepping motor comprises a rotary shaft, a cylindrical stator including first and second driving coils disposed along an axial direction of the rotary shaft and energizable with driving currents having different phases. A cylindrical permanent magnet rotor is secured to the rotary shaft in a coaxial relationship with the stator and is magnetized in a predetermined pattern. The motor has a housing to which the stator is secured and in which the rotor is accommodated for movement in the axial direction of the rotary shaft together with the rotary shaft and an adjustor for adjustably fixing the rotor with respect to the housing at a position in the axial direction of the rotary shaft at which the detent torque of the stepping motor presents a minimum value. An adjusting method for minimizing a detent torque of such stepping motor and a torque measuring apparatus which is used to put the adjusting method into practice are also disclosed.

3 Claims, 5 Drawing Sheets

PERMANENT MAGNET TYPE STEPPING MOTOR AND ADJUSTING METHOD FOR MINIMIZING ITS DETENT TORQUE

BACKGROUND OF THE INVENTION

1. Field of the Invention

This invention relates to a stepping motor, and more particularly to a stepping motor of the permanent magnet type.

2. Description of the Prior Art

Various types of stepping motors are conventionally known, and an exemplary one of such conventional stepping motors is constituted such that a pair of stator coils which form first and second phases are disposed along a direction parallel to a rotary shaft of the stepping motor.

A stepping motor of the type just mentioned is shown in FIG. 8. The stepping motor shown is a two-phase permanent magnet type stepping motor and includes a stator 2B which forms a first phase (hereinafter referred to as A phase), an A phase coil 2A wound on the stator 2B, a B phase stator 3B which forms a second phase (hereinafter referred to as B phase) and is disposed adjacent the A phase stator 2B in a direction parallel to a rotary shaft 13, and a B phase coil 3A wound on the B phase stator 3B.

A permanent magnet 12 is secured to the rotary shaft 13 and has a size sufficient to oppose the entire A phase coil 2A and B phase coil 3A. The permanent magnet 12 and rotary shaft 13 are supported for rotation by means of a pair of bearings 8 and 9 and a pair of housings 5 and 6.

A permanent magnet type stepping motor having such construction as described just above, however, has a drawback since a torque attracting the rotor to the stators (such torque will be hereinafter referred to as detent torque) is produced. The detent torque is produced when the coils are not energized with exciting currents and is caused by magnetic fluxes generated from the permanent magnet. The torque (holding torque) of the stepping motor when the coils are energized is distorted in waveform, which causes an increase in production of vibrations and acoustic noises.

Further, since the detent torque itself then acts as a load to the stepping motor, the output torque of the stepping motor is decreased as much. When the stepping motor is of a small size, such a construction is employed so that a strong permanent magnet of a rare earth element is adopted or the air gap between the stator and the rotor magnet is minimized. Consequently, there is a problem that the detent torque is increased as much so that the stepping motor cannot rotate smoothly.

Various solutions to the problem have been proposed. According to an exemplary one of such solutions, a 2-phase stepping motor is constructed such that a pair of A and B phase coils are disposed in a juxtaposed relationship along a direction of a rotary shaft and are displaced by 90 degrees by electric angle from each other. A cylindrical permanent magnet is secured integrally to a rotary shaft of the motor and is formed such that opposing faces thereof to an A phase stator and a B phase stator have an equal area so that the detent torque which is a second harmonic wave is cancelled by a combination of the A and B phases.

However, the magnitudes and shapes of waveforms of torque by A and B phases are different among individual stepping motors due to an influence of a saturated condition of a stator yoke, irregularity in magnetization of a magnet, accuracy in assembly of a stator and so forth. Consequently, it is difficult to cancel a second harmonic wave even if torques TA1 and TA2 by the A phase and torques TB1 and TB2 by the B phases are combined as seen from FIG. 7. Thus, the stepping motor has a problem in that a detent torque DT appears significant as it remains as a second harmonic wave, and the solution is not sufficient.

SUMMARY OF THE INVENTION

It is an object of the present invention to provide a stepping motor which is minimized in detent torque without causing a considerable dispersion among individual stepping motors.

In order to attain the object, according to an aspect of the present invention, there is provided a permanent magnet type stepping motor, which comprises a rotary shaft, a cylindrical stator including first and second driving coils disposed along an axial direction of the rotary shaft and energizable with driving currents having different phases, a cylindrical permanent magnet rotor secured to the rotary shaft in a coaxial relationship with the stator and magnetized in a predetermined pattern, a housing to which the stator is secured and in which the rotor is accommodated for movement in the axial direction of the rotary shaft together with the rotary shaft, and fixing means for adjustably fixing the rotor with respect to the housing at a position in the axial direction of the rotary shaft at which the detent torque of the stepping motor presents a minimum value.

With the stepping motor, the magnet rotor is adjustably fixed at a position at which the detent torque of the stepping motor presents a minimum value. Since such adjustment is performed at an assembling step for individual stepping motors to be manufactured, the detent torque can be minimized without having a considerable dispersion for the individual stepping motors.

The fixing means may include a supporting frame on which the housing is mounted, an adjusting screw adjustably screwed in the supporting frame, and spring means for engaging an end of the rotary shaft to normally urge the rotary shaft toward the adjusting screw to engage the other end of the rotary shaft with the adjusting screw.

According to another aspect of the present invention, there is provided an adjusting method for minimizing a detent torque of the permanent magnet type stepping motor using a torque measuring apparatus which comprises means for mounting thereon the housing of a permanent magnet type stepping motor, a rotary table having the mounting means mounted thereon and rotatable around an axis coincident with an axis of the rotary shaft of the stepping motor, driving means for driving the rotary table to rotate around the axis, rotational angle detecting means for detecting a rotational angle of the rotary table, an arm removably fixed at an end thereof to an extending perpendicularly from the rotary shaft of the stepping motor, and torque detecting means connected to the other end of the arm, wherein the adjusting method comprises the steps of mounting the housing of the stepping motor on the mounting means, fixing the arm to the rotary shaft of the stepping motor, rendering the driving means operative to rotate the rotary table, moving, during operation of the driving means, the rotary shaft in the axial direction to move the rotor with respect to the stator while measuring a detent torque of the stepping motor by means of the torque detecting means until a position of the rotary shaft is detected at which the detent torque of the stepping motor presents a minimum value, and fixing the rotary shaft at the position.

With the adjusting method, the rotary shaft and hence the magnet rotor are fixed at a position at which the detent torque of the stepping motor presents a minimum value. Accordingly, when a large number of stepping motors are to be produced, the detent torque can be minimized without having a considerable dispersion for the individual stepping motors.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
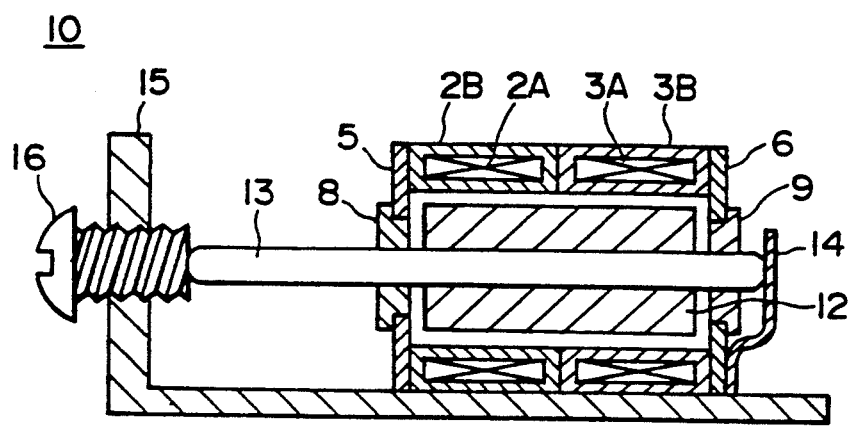
FIG. 1 is a sectional view of a stepping motor showing a preferred embodiment of the present invention.

Referring first to FIG. 1, there is shown a stepping motor to which the present invention is applied. The stepping motor shown is generally denoted at 10 and is secured to a fixing member 15. A magnet position adjusting screw 16 is mounted at a location of the fixing member 15 opposing to an end, left end in FIG. 1, of a rotary shaft 13.

The screw 16 is disposed such that a bottom face thereof is held in contact with the end of the rotary shaft 13 so that, when it is screwed in, i.e., in a rightward direction in FIG. 1, it moves the rotary shaft 13 in a horizontal rightward direction. A rotor magnet 12 secured to the rotary shaft 13 is then moved in an axial direction of the rotary shaft 13, that is, in the horizontal rightward direction, together with the rotary shaft 13.

A leaf spring 14 is secured to a housing 6 of the stepping motor 10, and normally urges the rotary shaft 13 in the leftward direction in FIG. 1 the leaf spring 14 so that it is resiliently pressed against the bottom face of the screw 16. The leaf spring prevents the rotary shaft 13 and the magnet 12 from being inadvertently moved in the axial direction of the rotary shaft 13.

Accordingly, the magnet 12 can be moved and adjusted in the axial rightward direction of the rotary shaft 13 by the screw 16 and can be held at the thus moved and adjusted position thereof so that it may not inadvertently be moved in the axial direction of the rotary shaft 13.

Figure 4:
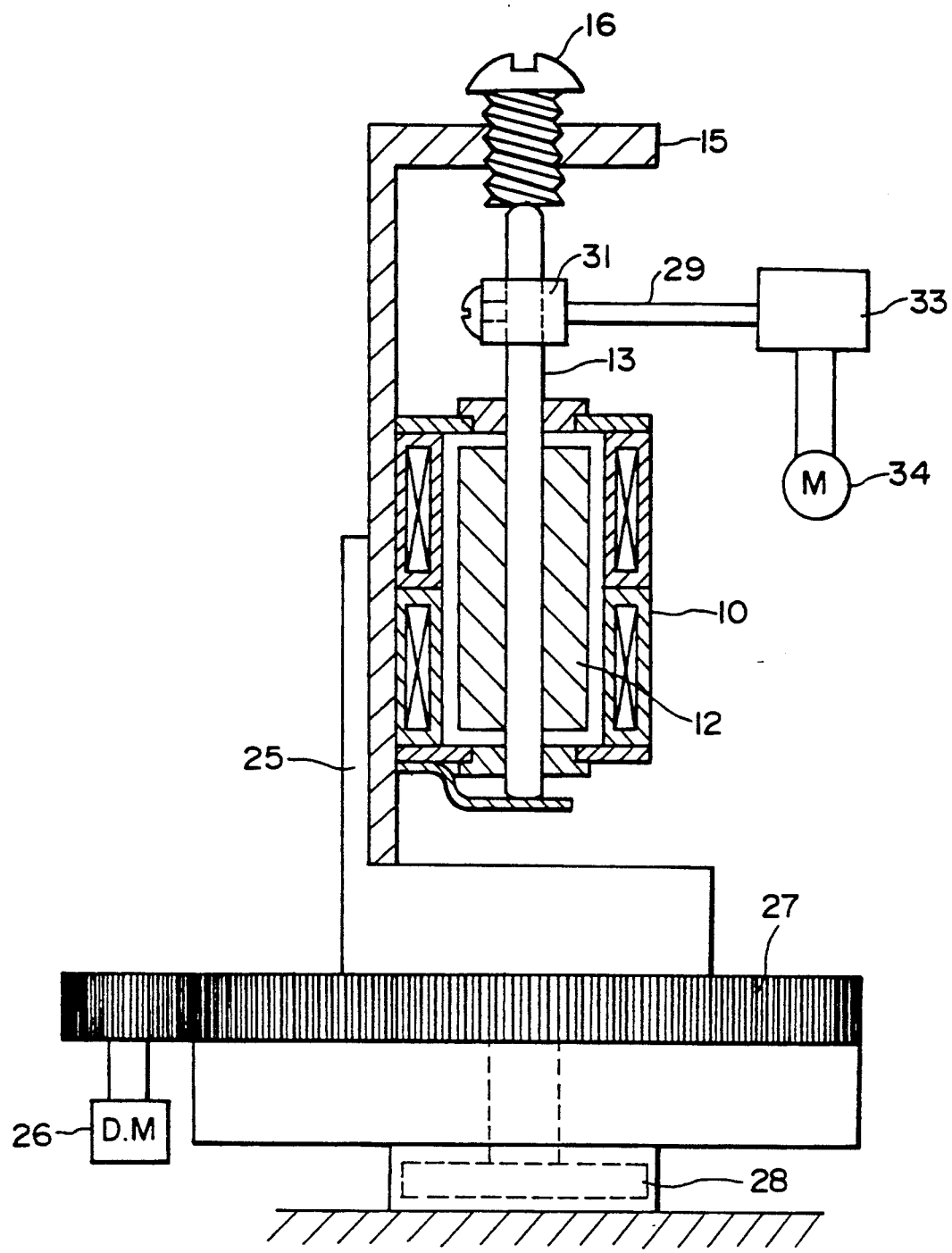
FIG. 4 is a side elevational view of a detent torque measuring apparatus for measuring a detent torque of a stepping motor.
Figure 5:
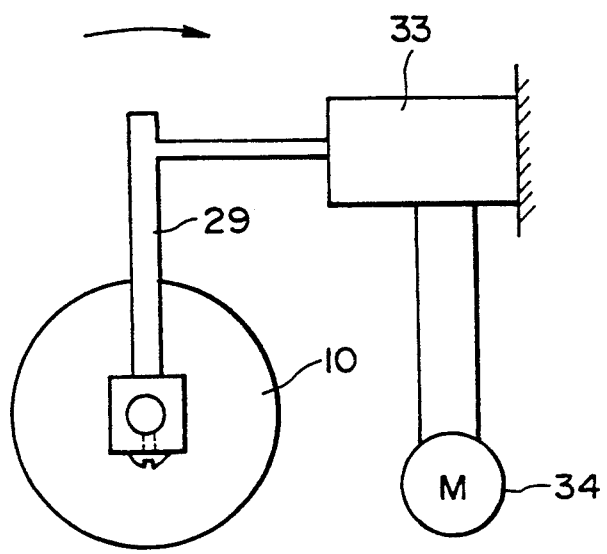
FIG. 5 is a top plan view of the detent torque measuring apparatus of FIG. 4.

Referring now to FIGS. 4 and 5, there is shown an apparatus for measuring a detent torque of a stepping motor. The detent torque measuring apparatus shown includes a receiving frame 25 for fixedly receiving thereon a stepping motor for measurement. The receiving frame 25 is placed on a rotary table 27 connected to a drive motor 26 so that it may be rotated around an axis coincident with an axis of the rotary shaft 13 of the stepping motor 10 received thereon. A rotary encoder 28 is located below and connected to the rotary table 27 for detecting a rotational angle or angular position of the rotary table 27. Meanwhile, an L-shaped arm 29 is removably mounted on and extends perpendicularly from the rotary shaft 13 of the stepping motor 10 by way of an arm fixing member 31. A well-known strain gage 33 is mounted at the other end of the L-shaped arm 29 and measures a variation in torque transmitted thereto from the rotary shaft 13 of the stepping motor 10. A result of such measurement is indicated on an indicator 34.

With the detent torque measuring apparatus, at an assembling step of such stepping motor 10 as described above, the fixing member 15 of the stepping motor 10 is mounted on the mounting frame 25, and the arm 29 is fixed to the rotary shaft 13 of the stepping motor 10 by means of the arm fixing member 31. Then, the drive motor 26 is energized to rotate the rotary table 27 so that the fixing member 25 and the stator section of the motor 10 may be urged to rotate around the axis of the rotary shaft 13, whereupon the rotary shaft 13 and hence the arm 29 tend to rotate around the axis of the shaft 13 with the arm 29 pressing at the other end thereof against the strain gage 33. The strain gage 33 develops a signal corresponding to a force applied thereto from the arm 29, and transmits such signal to the indicator 34. Consequently, a waveform of the detent torque of the stepping motor 10 is observed on the indicator 34. In this condition, the screw 16 is screwed in to move the magnet 12 in its axial direction while observing the waveform indicated on the indicator 34. Then, when the detent torque being observed exhibits a minimum value, the screw 16 is stopped to fix the magnet 12 with respect to the axial direction of the rotary shaft 13. Consequently, the stepping motor 10 is assembled in a condition wherein it presents a minimum detent torque.

Figure 6:
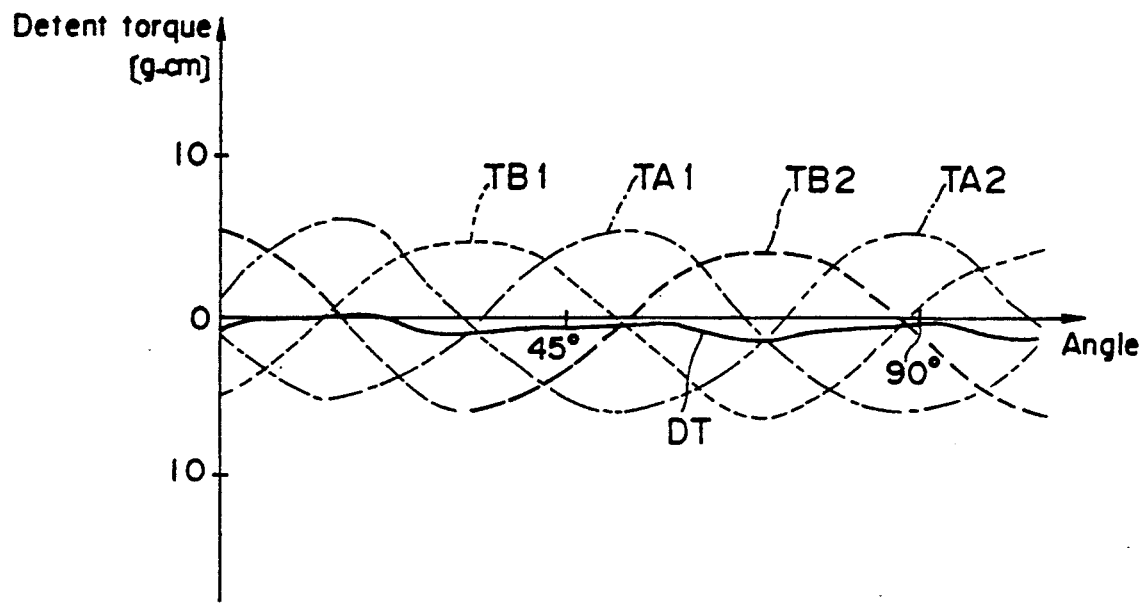
FIG. 6 is a waveform diagram illustrating a waveform of a detent torque of a stepping motor according to the present invention.
Figure 7:
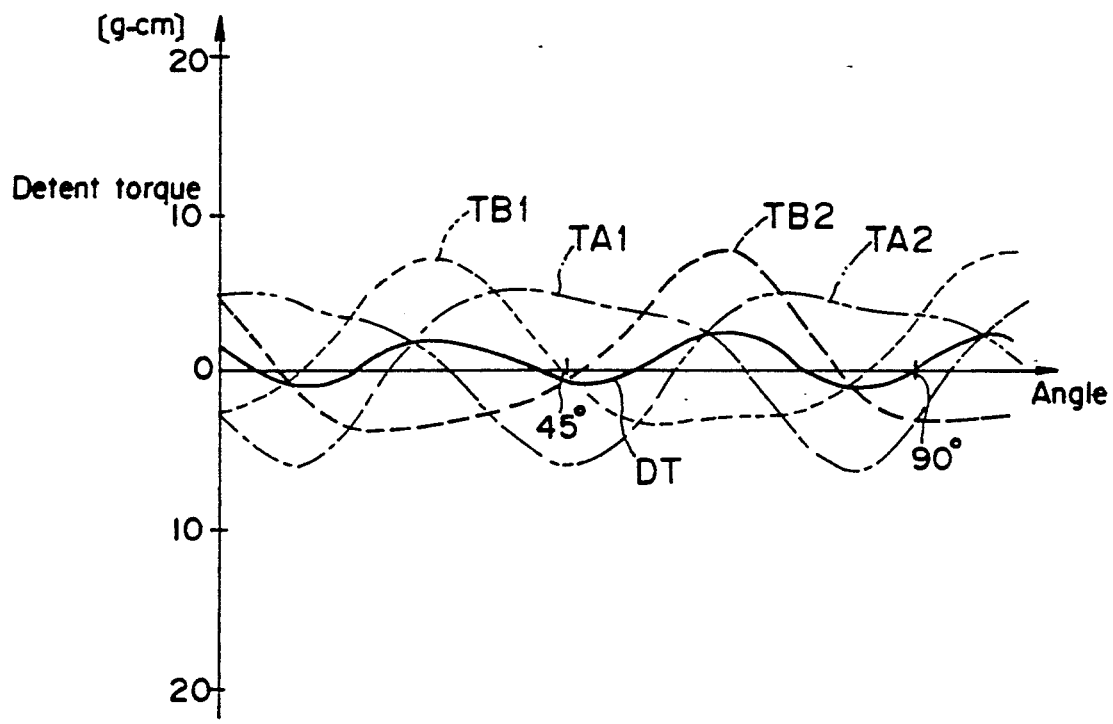
FIG. 7 is a similar view but illustrating a waveform of a detent torque of a conventional stepping motor.
Figure 8:
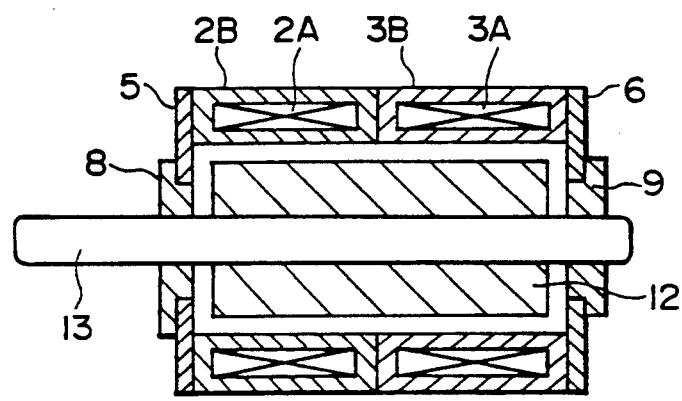
FIG. 8 is a sectional view showing a conventional stepping motor.

Accordingly, in this instance, a torque TA1 by the A phase and another torque TA2 of an inverted phase with respect to the A phase as well as a torque TB1 by the B phase and another torque TB2 of an inverted phase with respect to the B phase will have substantially equal waveform shapes and magnitudes as seen from FIG. 6. Consequently, the stepping motor 10 can be assembled while the detent torque DT, which is a combination of the torques TA1, TA2, TB1 and TB2, is minimized.

Accordingly, the output torque of the stepping motor 10 can be increased and vibrations and acoustic noises can be reduced by amounts corresponding to an amount by which the detent torque DT, which makes a load to rotation of the stepping motor 10, is reduced.

According to the stepping motor and the adjusting method for minimizing its detent torque described above, since individual stepping motors are assembled while adjusting the position of the magnet 12, a detent torque can be reduced stably for all of the thus assembled stepping motors without a dispersion among them.

Incidentally, as the waveform of the detent torque can be made to approach a waveform of a sine wave, the stepping motor 10 can be rotated smoothly.

It is to be noted that, while in the embodiment described above the position of the magnet 12 relative to the A phase coil 2A and the B phase coil 3A is adjusted by means of the screw 16 and the leaf spring 14, other various means may be employed alternatively for such adjustment.

Figure 2:
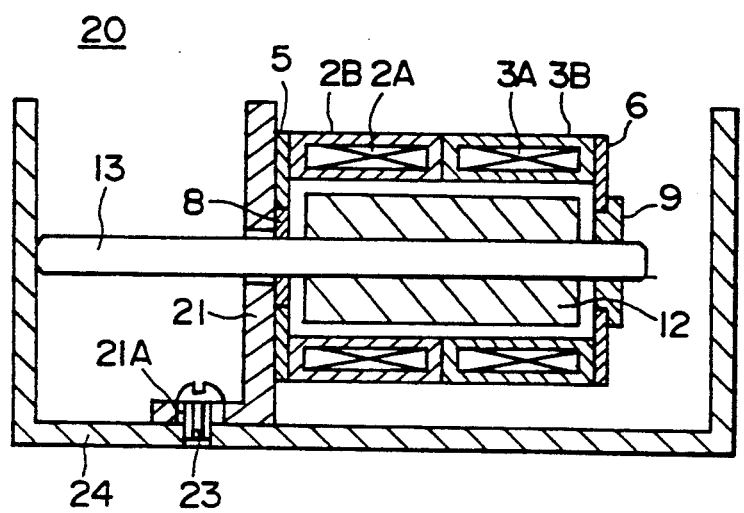
FIGS. 2 and 3 are similar views but showing different embodiments of the present invention.

One possible alternative arrangement is shown in FIG. 2. Referring to FIG. 2, the alternative stepping motor shown is generally denoted at 20 and includes a mounting member 21 fastened to a fixing member 24 by means of a screw 23. A stator section of the stepping motor 20 is secured to the mounting member 21.

A threaded hole 21A is formed in the form of an elongated hole in the mounting member 21 so as to allow the mounting member 21 to move in an axial direction of a rotary shaft 13 of the stepping motor 20.

Accordingly, by moving the mounting member 21 in an axial direction of the rotary shaft 13 with an end of the rotary shaft 13 held in contact with a side face of the fixing member 24, an A phase stator 2B and a B phase stator 3B are moved in the axial direction of the rotary shaft 13 in a condition wherein the rotary shaft 13 and a magnet 12 secured to the rotary shaft 13 are carried on the mounting member 21. Consequently, relative positions of the magnet 12 and the A phase coil 2A and B phase coil 3A can be adjusted.

Accordingly, by securing, by means of the screw 23, the mounting member 21 at a position on the fixing member 24 at which torques TA1 and TA2 (FIG. 4) by the A phase coil 2A and torques TA1 and TA2 (FIG. 4) by the B phase coil 3A have substantially equal waveform shapes and magnitudes, the detent torque of the stepping motor 20 is minimized.

Figure 3:
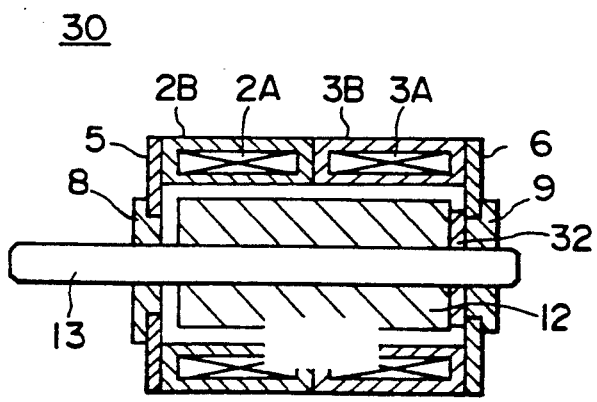

Referring now to FIG. 3, another alternative stepping motor is shown. The stepping motor shown is generally denoted at 30 and includes a spacer 32 having a predetermined thickness and interposed between a magnet 12 and a bearing 9. Accordingly, with the alternative stepping motor 30, relative positions of the magnet 12 and an A phase coil 2A and a B phase coil 3A can be adjusted by a distance corresponding to the thickness of the spacer 32.

Accordingly, if the spacer 32 having a thickness with which such a positional relationship can be obtained so that the torque by the A phase coil 2A and the torque by the B phase coil have substantially equal waveform shapes and magnitudes is interposed in position at an assembling step, then the detent torque of the stepping motor 30 can be minimized.

It is to be noted that, while in the embodiments described above, the present invention is applied to a two-phase stepping motor of the permanent magnet type, the present invention is not limited to this and can be applied widely to various other stepping motors.

Having now fully described the invention, it will be apparent to one of ordinary skill in the art that many changes and modifications can be made thereto without departing from the spirit and scope of the invention as set forth herein.

What is claimed is:

1. A permanent magnet type stepping motor comprising:
   a rotary shaft;
   a cylindrical stator including first and second driving coils disposed along an axial direction of said rotary shaft and energizeable with driving currents having different phases;
   a cylindrical permanent magnet rotor secured to said rotary shaft in a coaxial relationship with said stator and magnetized in a predetermined pattern;
   a housing to which said stator is secured and in which said rotor is accommodated for movement in the axial direction of said rotary shaft together with said rotary shaft; and
   fixing means for fixing said rotor with respect to said housing at a position in the axial direction of said rotary shaft at which the detent torque of said stepping motor presents a minimum value, wherein said fixing means comprises a supporting frame on which said housing is mounted, an adjusting screw adjustably screwed in said support frame, and spring means for engaging an end of said rotary shaft to normally urge said rotary shaft toward said adjusting screw so that the other end of said rotary shaft is engaged with said adjusting screw.

2. A permanent magnet type stepping motor, comprising:
   a rotary shaft;
   a cylindrical stator including first and second driving coils disposed along an axial direction of said rotary shaft and energizeable with driving currents having different phases;
   a cylindrical permanent magnet rotor secured to said rotary shaft in a coaxial relationship with said stator and magnetized in a predetermined pattern;
   a housing to which said stator is secured and in which said rotor is accommodated for movement in the axial direction of said rotary shaft together with said rotary shaft; and
   fixing means for fixing said rotor with respect to said housing at a position in the axial direction of said rotary shaft at which the detent torque of said stepping motor presents a minimum value, and wherein said fixing means comprises:
   a mounting member in which said housing is mounted and having an elongated hole extending along said axial direction;
   a fixing member having a surface for engaging one end of said rotary shaft; and
   fastening means extending through said elongated slot for fastening said mounting member to said fixing member, said fastening means being positioned along said elongated slot so that said surface of said fixing member places said rotor as said position.

3. A permanent magnet type stepping motor, comprising:
   a rotary shaft;
   a cylindrical stator including first and second driving coils disposed along an axial direction of said rotary shaft and energizeable with driving currents having different phases;
   a cylindrical permanent magnet rotor secured to said rotary shaft in a coaxial relationship with said stator and magnetized in a predetermined pattern;
   a housing to which said stator is secured and in which said rotor is accommodated for movement in the axial direction of said rotory shaft together with said rotary shaft; and
   fixing means for fixing said rotor with respect to said housing at a position in the axial direction of said rotary shaft at which the detent torque of said stepping motor presents a minimum value, and wherein said fixing means comprises a spacer located between said permanent magnet and said housing and dimensioned so that said rotary shaft is at said position.

* * * * *